(12) United States Patent
Glasner et al.

(10) Patent No.: US 7,412,473 B2
(45) Date of Patent: Aug. 12, 2008

(54) ARITHMETIC CIRCUITRY FOR AVERAGING AND METHODS THEREOF

(75) Inventors: Roy Glasner, Ramat Gan (IL); Yaron M. Sadeh, Kfar Saba (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 676 days.

(21) Appl. No.: 10/930,760

(22) Filed: Sep. 1, 2004

(65) Prior Publication Data

US 2006/0047736 A1    Mar. 2, 2006

(51) Int. Cl.
*G06F 7/38*    (2006.01)
(52) U.S. Cl. ...................................... 708/445
(58) Field of Classification Search ................... 708/445
See application file for complete search history.

(56) References Cited

U.S. PATENT DOCUMENTS

| | | | | | |
|---|---|---|---|---|---|
| 4,040,052 | A | * | 8/1977 | Stanislaw | 708/445 |
| 5,260,975 | A | * | 11/1993 | Saito | 375/327 |
| 5,517,436 | A | | 5/1996 | Andreas et al. | |
| 5,710,732 | A | * | 1/1998 | Wong | 708/445 |
| 5,818,532 | A | * | 10/1998 | Malladi et al. | 375/240.03 |
| 5,844,541 | A | * | 12/1998 | Cahill, III | 345/667 |
| 5,870,138 | A | * | 2/1999 | Smith et al. | 348/143 |
| 5,917,739 | A | * | 6/1999 | Wong | 708/445 |
| 6,007,232 | A | | 12/1999 | Wong | |
| 6,078,941 | A | * | 6/2000 | Jiang et al. | 708/625 |
| 2003/0097389 | A1 | * | 5/2003 | Saulsbury et al. | 708/445 |
| 2005/0213842 | A1 | * | 9/2005 | Aldrich et al. | 382/264 |
| 2005/0216545 | A1 | * | 9/2005 | Aldrich et al. | 708/670 |

\* cited by examiner

*Primary Examiner*—Tan V Mai
(74) *Attorney, Agent, or Firm*—Pearl Cohen Zedek Latzer, LLP

(57) ABSTRACT

A functional unit includes one or more instances of arithmetic circuitry for calculating averages. Each instance of arithmetic circuitry includes first, second and third adders, each having first and second inputs and an output that is a sum of the first and second inputs and a carry-in bit. An output of the first adder is coupled to a first input of the third adder, and an output of the second adder is coupled to a second input of the third adder. The arithmetic circuitry is able to calculate an arithmetic operation on a set of four inputs. The arithmetic operation is fully determined by control bits and may be: an average of two values (with or without rounding by 1), an average of four values (with or without rounding by 1 or 2), or a sum of four values.

17 Claims, 3 Drawing Sheets

ARITHMETIC CIRCUITRY FOR AVERAGING AND METHODS THEREOF

BACKGROUND OF THE INVENTION

Averaging arithmetic operations are very useful in the field of digital signal processing and particularly video filtering.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Figure 1:
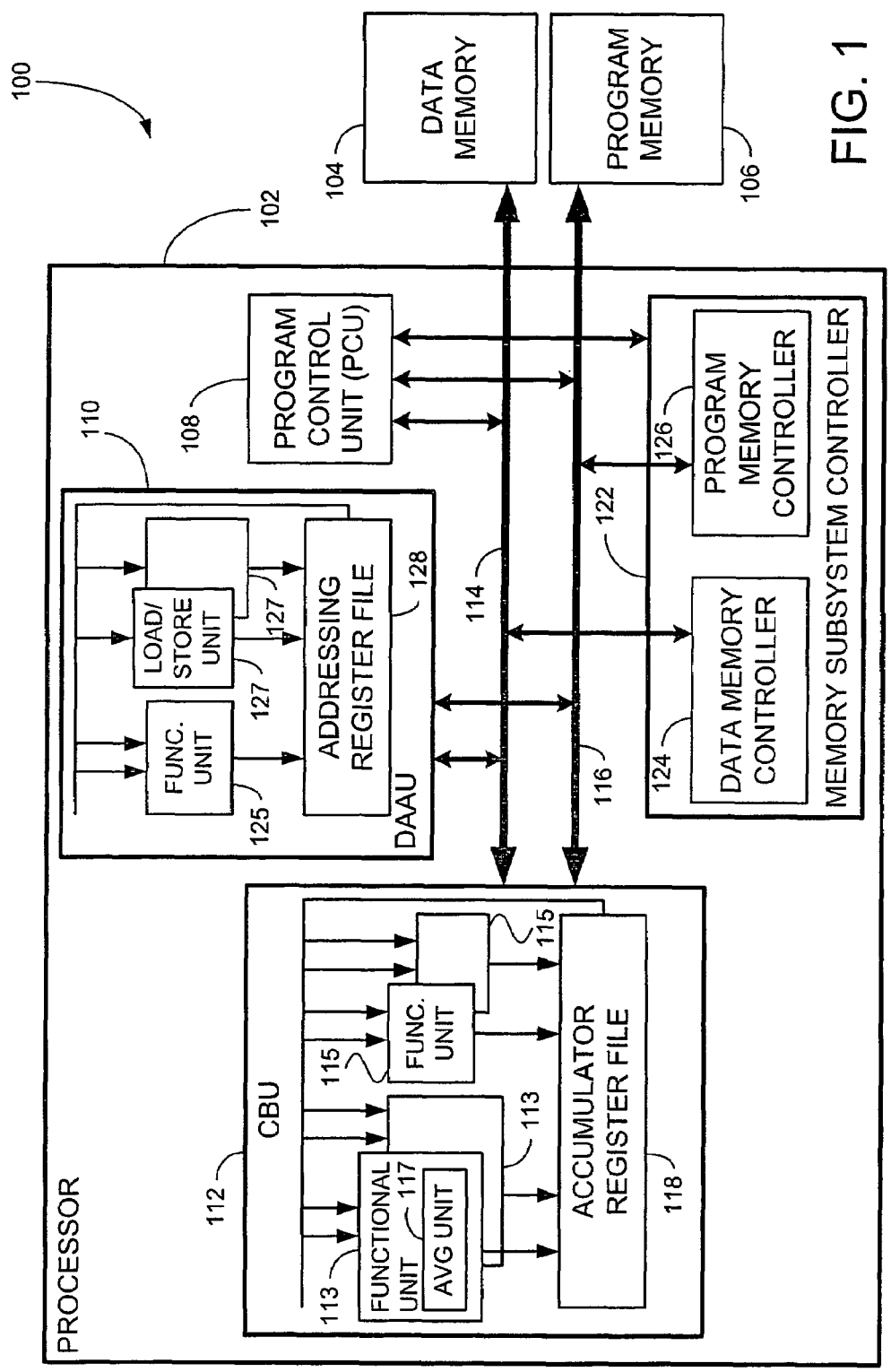
FIG. 1 is a block diagram of an exemplary device including a processor coupled to a data memory and to a program memory, according to some embodiments of the invention.

FIG. 1 is a block diagram of an exemplary apparatus 100 including a processor 102 coupled to a data memory 104 via a data memory bus 114 and to a program memory 106 via a program memory bus 116. Processor 102 may be a digital signal processor (DSP). Data memory 104 and program memory 106 may be the same memory. An exemplary architecture for processor 102 will now be described, although other architectures are also possible. Processor 102 includes a program control unit (PCU) 108, a data address and arithmetic unit (DAAU) 110, a computation and bit-manipulation unit (CBU) 112, and a memory subsystem controller 122. Memory subsystem controller 122 includes a data memory controller 124 coupled to data memory bus 114, and a program memory controller 126 coupled to program memory bus 116. PCU 108 is to retrieve, decode and dispatch machine language instructions and is responsible for the correct program flow. CBU 112 includes an accumulator register file 118 and functional units 113 and 115, having any of the following functionalities or combinations thereof: multiply-accumulate (MAC), add/subtract, bit manipulation, arithmetic logic, and general operations. Functional units 113 include one or more averaging units 117, which is described in more detail hereinbelow. DAAU 110 includes an addressing register file 128, load/store units 127 capable of loading and storing from/to data memory 104, and a functional unit 125 having arithmetic, logical and shift functionality.

Some machine language instructions may be executed by one or more averaging units 117. The inputs and outputs of averaging unit 117 are coupled to accumulator register file 118. (In other embodiments, functional unit 113 may have fixed input registers and/or fixed output registers.)

According to an embodiment of the invention, the arithmetic circuitry of averaging unit 117 enables the calculation of an arithmetic operation from the following list (in no particular order):
a) average of two values;
b) average of two values with rounding by 1;
c) average of four values;
d) average of four values with rounding by 1;
e) average of four values with rounding by 2; and
f) sum of four values.

The arithmetic circuitry of averaging unit may also enable the calculation of additional arithmetic operations that are not listed hereinabove.

Processor 102 has an instruction set. A single machine language instruction from the instruction set is sufficient to instruct processor 102 to have averaging unit 117 perform one of the above-listed arithmetic operations. An instruction cycle is the time period during which one machine language instruction is fetched from memory and executed. According to embodiments of the invention, averaging unit 117 is able to perform any of the above-listed arithmetic operations in a single instruction cycle.

Figure 2:
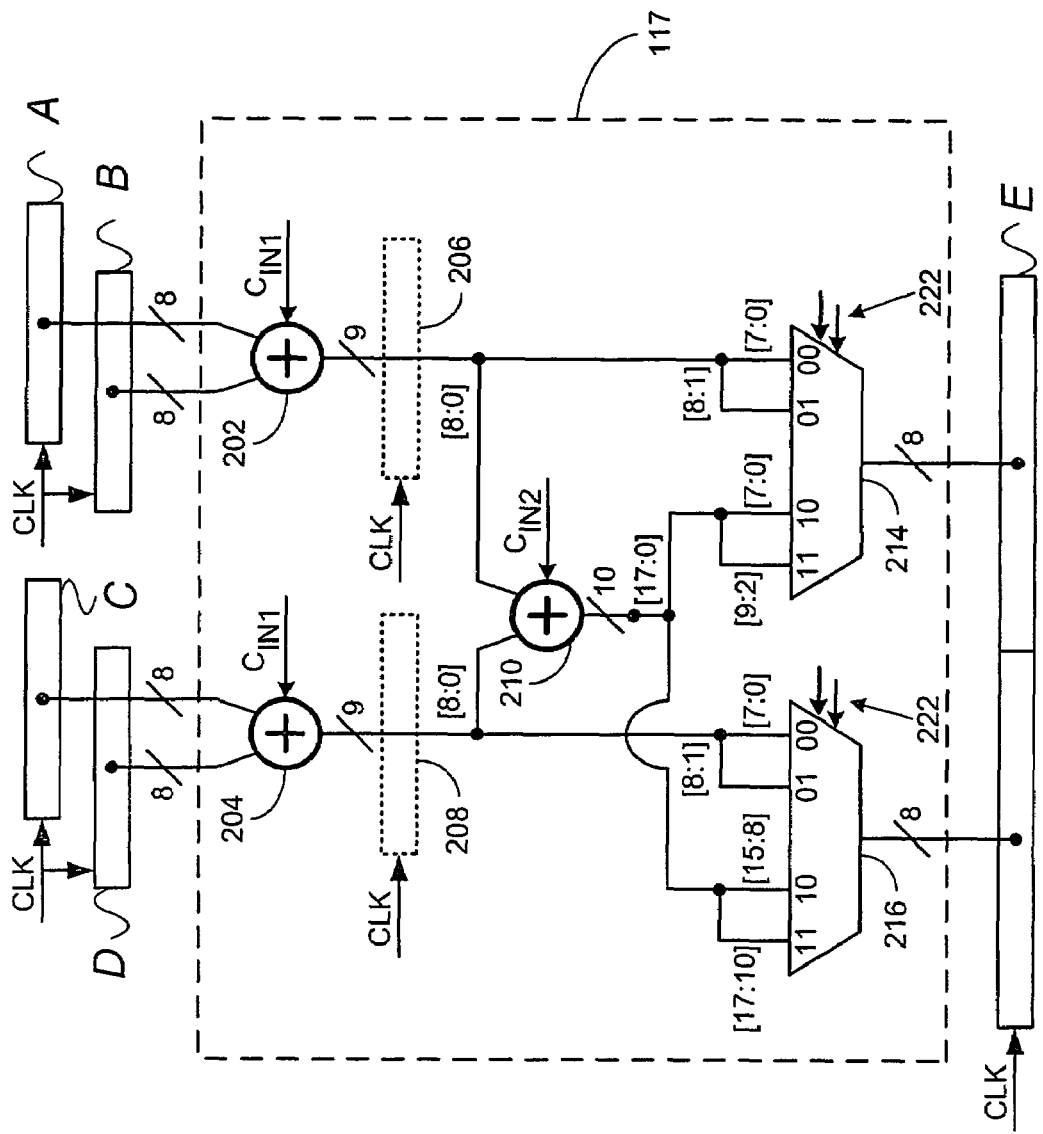
FIG. 2 is a block diagram of an averaging unit in the processor of FIG. 1, according to an embodiment of the invention.

FIG. 2 is a block diagram of averaging unit 117, according to an embodiment of the invention. In the example shown in FIG. 2, the arithmetic operations calculated by averaging unit 117 are applied to fixed-point values of 8-bits width. It is obvious to one of ordinary skill in the art how to modify averaging unit 117 so that the arithmetic operations may be applied to values of a different width and/or to floating-point values.

Averaging unit 117 includes 8-bit adders 202 and 204, 9-bit adder 210, and multiplexers 214 and 216. 8-bit adders 202 and 204 each receive two 8-bit inputs and a carry-in bit $C_{IN1}$ and output a 9-bit result. 9-bit adder 210 receives two 9-bit inputs and a carry-in bit $C_{IN2}$ and outputs a 10-bit result. The 10-bit output of adder 210 may be sign extended to 18 bits. Each multiplexer has four 8-bit inputs, denoted "00", "01", "10" and "11", respectively, and selects one of the 8-bit inputs according to two selection bits 222.

Averaging unit 117 receives four inputs (to be received from 8-bit registers A, B, C and D) and control bits ($C_{IN1}$, $C_{IN2}$, and selection bits 222), and produces two 8-bit outputs (to be stored in the low and high parts of a 16-bit register E). In some embodiments, registers A and C may be part of a single register having at least 16 bits. Similarly, in some embodiments, registers B and D may be part of a single register having at least 16 bits. Similarly, in some embodiments, register E may be part of a register having more than 16 bits. Registers A, B, C, D and E may be coupled to averaging unit 117 through multiplexers or any other combinatorial logic.

Average of Two Values

Averaging unit 117 may perform an average of two 8-bit values in parallel for two pairs of inputs, as follows. The desired operation is:

$$(A+B) >> 1 \to E_L$$

$$(C+D) >> 1 \to E_H$$

$E_L$ and $E_H$ denote respectively the low and high parts of register E. Functional unit 113 sets carry-in bit $C_{IN1}$ to zero and the selection bits of multiplexers 214 and 216 to "01". Adder 202 adds inputs from registers A and B, and adder 204 adds inputs from registers C and D. Since carry-in bit $C_{IN1}$ is zero, it does not contribute to the sums calculated by adders 202 and 204. All 9 bits of the output of adders 202 and 204 are shifted 1 bit to the right, simply by having bits [8:1] of the output of adders 202 and 204 wired to the "01" input of the multiplexers 214 and 216, respectively. Since the control bits of multiplexers 214 and 216 are set to "01", it is the "01" input that is selected by the multiplexers as the output of averaging unit 117 and stored in the low and high parts, respectively, of register E.

Average of Two Values with Rounding by 1

Averaging unit 117 may perform an average of two 8-bit values with rounding by 1 in parallel for two pairs of inputs, as follows. The desired operation is:

$(A+B+1)>>1 \rightarrow E_L$ $(C+D+1)>>1 \rightarrow E_H$

Functional unit 113 sets carry-in bit $C_{IN1}$ to one and the selection bits of multiplexers 214 and 216 to "01". Adder 202 adds inputs from registers A and B, and adder 204 adds inputs from registers C and D. Since carry-in bit $C_{IN1}$ is one, it contributes to each of the sums calculated by adders 202 and 204. All 9 bits of the output of adders 202 and 204 are shifted 1 bit to the right, simply by having the bits [8:1] of the output of adders 202 and 204 wired to the "01" input of the multiplexers 214 and 216, respectively. Since the selection bits of multiplexers 214 and 216 are set to "01", it is the "01" input that is selected by the multiplexers as the output of averaging unit 117 and stored in the low and high parts, respectively, of register E.

Average of Four Values

Averaging unit 117 may perform an average of four 8-bit values, as follows. The desired operation is:

$(A+B+C+D)>>2 \rightarrow E$

Functional unit 113 sets carry-in bits $C_{IN1}$ and $C_{IN2}$ to zero and the selection bits of multiplexers 214 and 216 to "11". Adder 202 adds inputs from registers A and B, and adder 204 adds inputs from registers C and D. Since carry-in bit $C_{IN1}$ is zero, it does not contribute to the sums calculated by adders 202 and 204. Adder 210 adds the 9-bit outputs of adders 202 and 204. Since carry-in bit $C_{IN2}$ is zero, it does not contribute to the sum calculated by adder 210. The 10 bits of output of adder 210 may be sign extended to 18 bits, and then shifted 2 bits to the right, simply by having bits [17:10] of the output of adder 210 wired to the "11" input of the multiplexer 216, and by having bits [9:2] of the output of adder 210 wired to the "11" input of multiplexer 214. Since the selection bits of multiplexers 214 and 216 are set to "11", it is the "11" input that is selected by the multiplexers as the output of averaging unit 117 and stored in the low and high parts, respectively, of register E.

Average of Four Values with Rounding by 1

Averaging unit 117 may perform an average of four 8-bit values with rounding by 1, as follows. The desired operation is:

$(A+B+C+D+1)>> \rightarrow E$

Functional unit 113 sets carry-in bit $C_{IN1}$ to zero, and carry-in bit $C_{IN2}$ to one, and the selection bits of multiplexers 214 and 216 to "11". Adder 202 adds inputs from registers A and B, and adder 204 adds inputs from registers C and D. Since carry-in bit $C_{IN1}$ is zero, it does not contribute to the sums calculated by adders 202 and 204. Adder 210 adds the 9-bit outputs of adders 202 and 204. Since carry-in bit $C_{IN2}$ is one, it contributes to the sum calculated by adder 210. The 10 bits of output of adder 210 may be sign extended to 18 bits, and then are shifted 2 bits to the right, simply by having bits [17:10] of the output of adder 210 wired to the "11" input of the multiplexer 216, and by having bits [9:2] of the output of adder 210 wired to the "11" input of multiplexer 214. Since the selection bits of multiplexers 214 and 216 are set to "11", it is the "11" input that is selected by the multiplexers as the output of averaging unit 117 and stored in the low and high parts, respectively, of register E.

Average of Four Values with Rounding by 2

Averaging unit 117 may perform an average of four 8-bit values with rounding by 2, as follows. The desired operation is:

$(A+B+C+D+2)>>2 \rightarrow E$

Functional unit 113 sets carry-in bit $C_{IN1}$ to one, and carry-in bit $C_{IN2}$ to zero, and the selection bits of multiplexers 214 and 216 to "11". Adder 202 adds inputs from registers A and B, and adder 204 adds inputs from registers C and D. Since carry-in bit $C_{IN1}$ is one, it contributes to each of the sums calculated by adders 202 and 204. Adder 210 adds the 9-bit outputs of adders 202 and 204. Since carry-in bit $C_{IN2}$ is zero, it does not contribute to the sum calculated by adder 210. The 10 bits of output of adder 210 may be sign extended to 18 bits, and then are shifted 2 bits to the right, simply by having bits [17:10] of the output of adder 210 wired to the "11" input of the multiplexer 216, and by having bits [9:2] of the output of adder 210 wired to the "11" input of multiplexer 214. Since the selection bits of multiplexers 214 and 216 are set to "11", it is the "11" input that is selected by the multiplexers as the output of averaging unit 117 and stored in the low and high parts, respectively, of register E.

Sum of Four Values

Averaging unit 117 may perform a sum of four 8-bit values, as follows. The desired operation is:

(A+B+C+D)→E

Functional unit 113 sets carry-in bits $C_{IN1}$ and $C_{IN2}$ to zero, and the selection bits of multiplexers 214 and 216 to "10". Adder 202 adds inputs from registers A and B, and adder 204 adds inputs from registers C and D. Since carry-in bit $C_{IN1}$ is zero, it does not contribute to the sums calculated by adders 202 and 204. Adder 210 adds the 9-bit outputs of adders 202 and 204. Since carry-in bit $C_{IN2}$ is zero, it does not contribute to the sum calculated by adder 210. The 10 bits of output of adder 210 may be sign extended to 18 bits, and bits [15:8] of the output of adder 210 are wired to the "10" input of the multiplexer 216, and bits [7:0] of the output of adder 210 are wired to the "10" input of multiplexer 214. Since the selection bits of multiplexers 214 and 216 are set to "10", it is the "10" input that is selected by the multiplexers as the output of averaging unit 117 and stored in the low and high parts, respectively, of register E.

The arithmetic operations that averaging unit 117 is able to calculate are summarized in the table below, along with the values of the control bits that are sufficient to fully determine which arithmetic operation is to be performed.

| Arithmetic Operation | $C_{IN1}$ | $C_{IN2}$ | selection bits |
|---|---|---|---|
| average of two values | 0 | 0 | "01" |
| average of two values with rounding by 1 | 1 | 0 | "01" |
| average of four values | 0 | 0 | "11" |
| average of four values with rounding by 1 | 0 | 1 | "11" |
| average of four values with rounding by 2 | 1 | 0 | "11" |
| sum of four values | 0 | 0 | "10" |

Since none of these operations uses the selection bits 222 set to "00", the multiplexers 214 and 216 of averaging unit 117 may be replaced by 3-input multiplexers. Alternatively, using the 4-input multiplexers 214 and 216 of averaging unit 117, averaging unit 117 is able to perform sums of two values by setting $C_{IN1}$ and $C_{IN2}$ to zero and setting the selection bits to "00". Alternatively, averaging unit 117 may have only 2-input multiplexers and may therefore be able to perform only some of the above-listed arithmetic operations. Alternatively averaging unit 117 may have no multiplexers at all and may therefore be able to perform even fewer of the above-listed arithmetic operations.

As shown in FIG. 2, the inputs are available from registers A, B, C and D. Register E may capture the execution result (output) from averaging unit 117. However, due to timing considerations such as propagation delays inside averaging unit 117 or due to any other reason, the purely combinatorial operation of averaging unit 117 may be broken into sequential stages using pipeline registers, for example, registers 206 and 208, and of course the original input registers and original output registers. In the example where pipeline registers 206 and 208 are added to averaging unit as shown in FIG. 2 with dotted lines, in any given clock cycle, pipeline registers 206 and 208 may capture the intermediate results of adders 204 and 206 that were calculated in a previous clock cycle. In a subsequent clock cycle, the intermediate results are propagated through the rest of averaging unit 117 and captured by register E. The placement of pipeline registers to store intermediate results within averaging unit 117 is a matter of engineering design. Several such levels of pipeline registers may be added.

Figure 3:
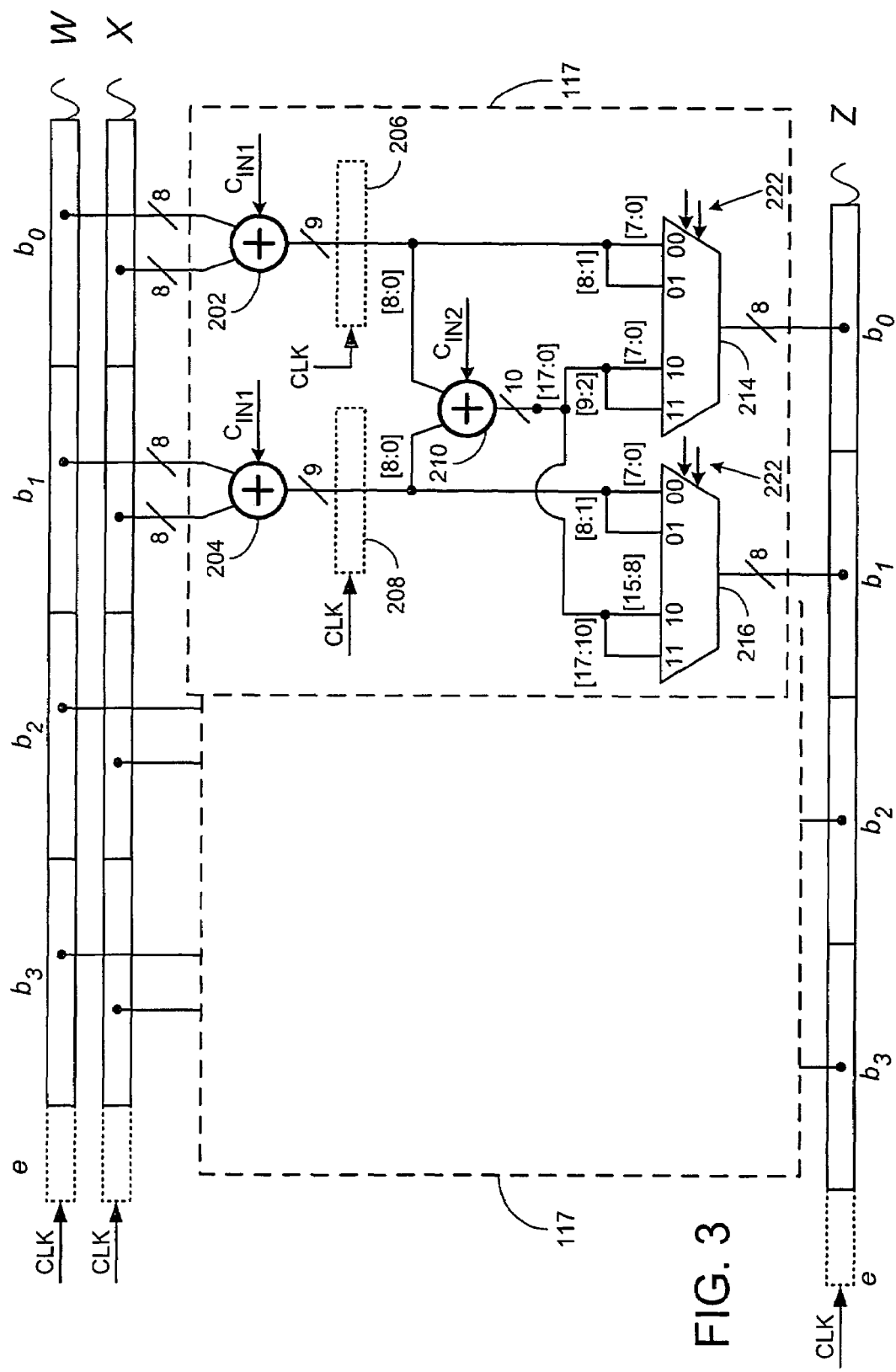
FIG. 3 is a block diagram of an averaging unit in the processor of FIG. 1, according to another embodiment of the invention.

In the embodiment shown in FIG. 3, registers W, X and Z of accumulator register file 118 employ a packed data format, in which the bits of a register are logically divided into a number of fixed-size data elements, each of which represents a separate value. For example, registers W, X and Z may be 32 bits wide, with b0, b1, b2 and b3 denoting respectively the four separate 8-bit values contained in the register. Optionally, registers W, X and Z may each have an extension, denoted e, of additional bits.

A packed data format may be part of the Single Instruction Multiple Data (SIMD) architecture of processor 102, so that a single machine language instruction may result in processor 102 performing the same operation on multiple data items in parallel.

Therefore, while a first instance of averaging unit 117 receives parts b0 and b1 of registers W and X as its four inputs, and outputs its results to parts b0 and b1 of register Z, a second instance of averaging unit 117 receives parts b2 and b3 of registers W and X as its four inputs, and outputs its results to parts b0 and b1 of register Z. Both instances of averaging unit 117 may receive the same control bits, namely carry-in bits $C_{IN1}$, $C_{IN2}$ and selection bits 222 for the multiplexers. This will effectively result in an arithmetic operation from the above-mentioned list being calculated for multiple data items in parallel. It is obvious to a person of ordinary skill in the art how to modify FIG. 3 for other packed data formats.

It is obvious to a person of ordinary skill in the art how to take two or more instances of the arithmetic circuitry described hereinabove and to calculate therefrom averages and/or sums of eight values, sixteen values, etc. with additional adders and multiplexers.

Although embodiments of the invention have been described in the context of a processor, other embodiments of the invention include one or more instances of the arithmetic circuitry described hereinabove in the context of other logic circuitry that are not processors. A non-exhaustive list of examples for logic circuitry that are not processors includes a field programmable gate array (FPGA), an application specific integrated circuit (ASIC), an application specific standard product (ASSP), a dedicated or stand-alone device and the like.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A functional unit for digital signal processing comprising:
    first, second and third adders, each having first and second inputs and an output that is a sum of said first and second inputs and a carry-in bit, wherein an output of said first adder is coupled to a first input of said third adder, and an output of said second adder is coupled to a second input of said third adder;
    a first multiplexer having at least a first input to receive said output of said first adder right shifted by 1 bit, and a second input to receive least significant bits of an output of said third adder right shifted by 2 bits; and
    a second multiplexer having at least a first input to receive said output of said second adder right shifted by 1 bit and a second input to receive most significant bits of said output of said third adder right shifted by 2 bits.

2. The functional unit of claim 1, wherein said first multiplexer has a third input to receive least significant bits of an output of said third adder, and said second multiplexer has a third input to receive most significant bits of said output of said third adder.

3. The functional unit of claim 2, further comprising:
    a control mechanism to set values of said carry-in bit for said first adder, said carry-in bit for said second adder and said carry-in bit for said third adder, and to determine which input of said first multiplexer is selected as its output and to determine which input of said second multiplexer is selected as its output.

4. The functional unit of claim 3, wherein said functional unit is a part of a signal processing apparatus.

5. The functional unit of claim 2, further comprising:
    a second instance of said arithmetic circuitry in parallel with said first instance of said arithmetic circuitry.

6. The functional unit of claim 5, wherein said functional unit is a part of a signal processing apparatus.

7. A functional unit for digital signal processing comprising:
    first, second and third adders, each having first and second inputs and an output that is a sum of said first and second inputs and a carry-in bit, wherein an output of said first adder is coupled to a first input of said third adder, and an output of said second adder is coupled to a second input of said third adder;

a first multiplexer having at least a first input to receive said output of said first adder right shifted by 1 bit, and a second input to receive least significant bits of an output of said third adder; and a second multiplexer having at least a first input to receive said output of said second adder right shifted by 1 bit and a second input to receive most significant bits of said output of said third adder.

8. A functional unit for digital signal processing comprising:

first, second and third adders, each having first and second inputs and an output that is a sum of said first and second inputs and a carry-in bit, wherein an output of said first adder is coupled to a first input of said third adder, and an output of said second adder is coupled to a second input of said third adder;

a first multiplexer having at least a first input to receive least significant bits of an output of said third adder right shifted by 2 bits, and a second input to receive least significant bits of said output of said third adder; and a second multiplexer having at least a first input to receive most significant bits of said output of said third adder right shifted by 2 bits and a second input to receive most significant bits of said output of said third adder.

9. A processor for digital signal processing comprising:

arithmetic circuitry to receive control bits and four inputs, said arithmetic circuitry able to calculate, in a single instruction cycle, an arithmetic operation that is fully determined by said control bits, wherein said arithmetic circuitry includes:

a first adder to add said first input, said second input and a first carry-in bit to produce a first sum;

a second adder to add said third input, said fourth input and said first carry-in bit to produce a second sum;

a third adder to add said first sum, said second sum and a second carry-in bit to produce a third sum;

a first multiplexer having at least a first input to receive said first sum right shifted by 1 bit, a second input to receive least significant bits of said third sum, and a third input to receive least significant bits of said third sum right shifted by 2 bits; and a second multiplexer having at least a first input to receive said second sum right shifted by 1 bit, a second input to receive most significant bits of said third sum, and a third input to receive most significant bits of said third sum right shifted by 2 bits; and a program control unit to set values of said control bits based on decoding of a single machine language instruction from an instruction set of said processor, wherein said arithmetic operation is selected from a group including:

a) an average of a first and a second of said four inputs and an average of a third and a fourth of said four inputs, b) an average of said first and second of said four inputs with rounding by 1 and an average of said third and fourth of said four inputs with rounding by 1, and c) at least one of the following:
  i) an average of said four inputs,
  ii) an average of said four inputs with rounding by 1,
  iii) an average of said four inputs with rounding by 2, and
  iv) a sum of said four inputs.

10. The processor of claim 9, wherein for a first value of two or more selection bits, said first multiplexer is to output its first input and said second multiplexer is to output its first input, for a second value of said selection bits, said first multiplexer is to output its second input and said second multiplexer is to output its second input, and for a third value of said selection bits, said first multiplexer is to output its third input and said second multiplexer is to output its third input.

11. The processor of claim 10, wherein said control bits affect said first carry-in bit, said second carry-in bit and said selection bits.

12. The processor of claim 9, wherein said arithmetic circuitry further includes pipeline registers to store intermediate results of said arithmetic operation.

13. A processor for digital signal processing comprising:

a program control unit to set values of control bits based on decoding a single machine language instruction from an instruction set of said processor;

a first instance of arithmetic circuitry to receive a first set of inputs, to receive said values of said control bits and to calculate, in a single instruction cycle, an arithmetic operation on said first set of inputs that is fully determined by said values of said control bits; and one or more additional instances of said arithmetic circuitry, each to receive a respective set of inputs, to receive said values of said control bits and to calculate said arithmetic operation on said respective set of inputs in said single instruction cycle;

wherein said arithmetic operation calculated on a set of four inputs is selected from a group including:

a) an average of two of said four inputs and an average of another two of said four inputs, b) an average of two of said four inputs with rounding by 1 and an average of another two of said four inputs with rounding by 1, and c) at least one of the following:
  i) an average of said four inputs,
  ii) an average of said four inputs with rounding by 1,
  iii) an average of said four inputs with rounding by 2, and
  iv) a sum of said four inputs, wherein each instance of said arithmetic circuitry includes:

a first adder to add two of said four inputs and a first carry-in bit to produce a first sum;

a second adder to add another two of said four inputs and said first carry-in bit to produce a second sum;

a third adder to add said first sum, said second sum and a second carry-in bit to produce a third sum;

a first multiplexer having at least a first input to receive said first sum right shifted by 1 bit, a second input to receive least significant bits of said third sum, and a third input to receive least significant bits of said third sum right shifted by 2 bits; and a second multiplexer having at least a first input to receive said second sum right shifted by 1 bit, a second input to receive most significant bits of said third sum, and a third input to receive most significant bits of said third sum right shifted by 2 bits.

14. The processor of claim 13, wherein for a first value of two or more selection bits, said first multiplexer is to output its first input and said second multiplexer is to output its first input, for a second value of said selection bits, said first multiplexer is to output its second input and said second multiplexer is to output its second input, and for a third value of said selection bits, said first multiplexer is to output its third input and said second multiplexer is to output its third input.

15. The processor of claim 14, wherein said control bits affect said first carry-in bit, said second carry-in bit and said selection bits.

16. The processor of claim 13, wherein said arithmetic circuitry further includes pipeline registers to store intermediate results of said arithmetic operation.

17. The processor of claim 13, wherein said four inputs are binary fixed-point values of a particular width, the processor further comprising:

a register of at least four times said particular width to store in its least significant bits two of said first set of inputs for said first instance of said arithmetic circuitry, and in its next least significant bits, two of a set of inputs for an additional instance of said arithmetic circuitry; and another register of at least four times said particular width to store in its least significant bits another two of said first set of inputs for said first instance of said arithmetic circuitry, and in its next significant bits, another two of said set of inputs for said additional instance of said arithmetic circuitry.

* * * * *